July 18, 1950 — E. CURRAN — 2,515,759
BIT STOCK
Filed May 23, 1946

ERNEST CURRAN
INVENTOR

BY Smith, Russell & Squire
ATTORNEYS

Patented July 18, 1950

2,515,759

UNITED STATES PATENT OFFICE 2,515,759

BITSTOCK

Ernest Curran, Flushing, N. Y.

Application May 23, 1946, Serial No. 671,669

1 Claim. (Cl. 145—66)

This invention relates to improvements in tools and has particular reference to an improved device which may be utilized as a holder for a speed wrench, a drill, a reamer, a counter-sinking tool, an auger and the like.

An object of the invention is the provision of a device of this kind which may be operated by the use of but one hand.

A further object of the invention is the provision of a novel means for holding various tools which may be utilized with the device.

Another object is the provision of a device of this kind which may be operated in either a clockwise or counterclockwise direction without the consequent loosening of tools when force is applied to the device.

Other and further objects of the invention will become apparent from a reading of the following specification, taken in conjunction with the appended claim.

Referring more particularly to the drawings, there is shown therein a tool including a shank 10, one end of which has revolubly mounted thereon an operating handle 11. It will be seen that the shank 10 penetrates nearly the entire handle and that there is provided a metallic liner 12 for furnishing a bearing for the shank when the tool is in operation. A lock washer 13 is clamped in a groove at the extreme end of the shank, thereby preventing the handle from accidental removal from the shank.

Figure 2:
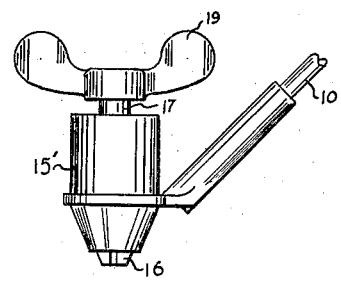
Figure 2 is a detail view of a modified form of the invention.
Figure 4:
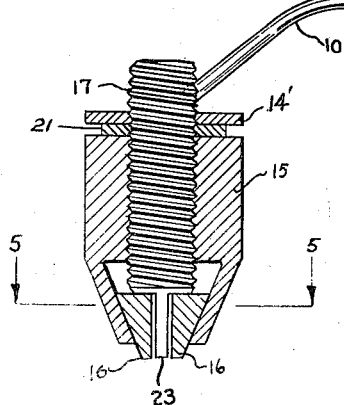
Figure 4 is an enlarged sectional view disclosing details of the invention.
Figure 5:
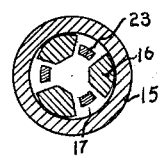
Figure 5 is a sectional view taken along line 5—5 of Figure 4.

To the other end of the shank is permanently affixed by electrical welding or the like, a bracket 14. A chuck body 15 is carried by the bracket and is provided with the customary jaws 16. The jaws are actuated by a threaded shaft 17 which is adapted to be turned by means of an integrally formed offset locking handle 18, or, as shown in the modified form in Figure 2, by a wing nut 19. The bracket 14 is threaded upon the threaded shaft as indicated in Fig. 4 and will serve to lock the shaft in its tightened position upon the jaws 16 and to render the shank 10 rigid upon chuck body 15. A washer 21 lies under the bracket 14 to permit the easy turning of the bracket upon the chuck body 15.

It will be seen that the shank 10 is bent at 20 so that the operating handle extends from that point toward the axis of the chuck 15.

Figure 1:
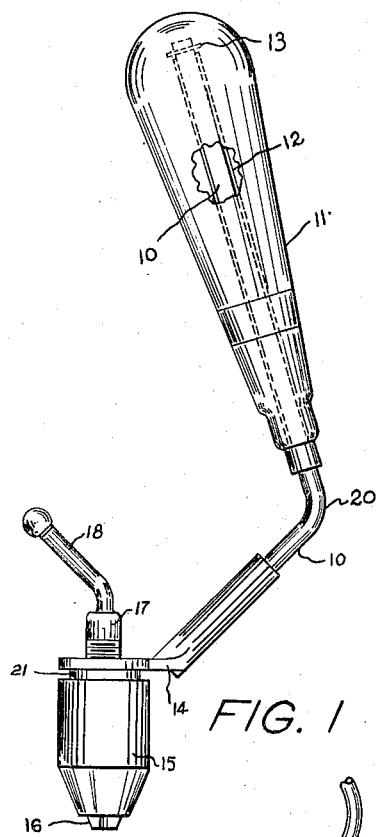
Figure 1 is an elevational view of a device embodying the invention.
Figure 3:
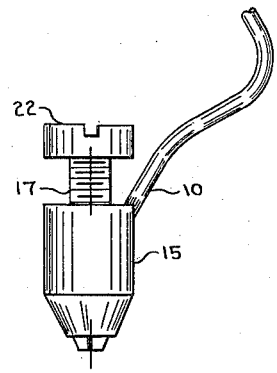
Figure 3 is a view similar to Figure 2 showing another form the invention may take.

In the form of the invention shown in Figure 3, the shank 10 is embedded or otherwise affixed to the body of the chuck 15' and the shank 17 is provided with a screw head 22 for actuating the same.

In the form shown in Figure 4, the shank 10 is affixed to shaft 17 and the chuck is of the type having separators 23 formed integrally with the shaft 17. In this instance, it will be apparent that a movement of the shank 10 will cause a rotation of the entire chuck once a tool has been locked therein. A member 14' is threaded upon shaft 17 and serves to lock shaft 17 in its adjusted position upon jaws 16.

In operation, it will be apparent that a selected tool may be locked in the jaws 16 by turning the locking handle 18, wing nut 19, or screw head 22, and that thereupon the operating handle 11 may be grasped in one hand and rotary motion be imparted to the tool by moving the hand in a circular motion, keeping the wrist substantially motionless.

While only certain forms of the invention have been shown and described herein, it will be apparent to those skilled in the art that many minor modifications may be made without departing from the spirit of the invention or the scope of the appended claims.

What is claimed as new and desired to be secured by Letters Patent of the United States is:

In a device of the character described, a chuck body having a central bore with threaded and unthreaded parts, jaws adjustable in the unthreaded part and adapted to grasp a tool, a threaded shaft adjustable in the threaded part of the bore to lock said jaws upon the tool, manipulable means for turning said shaft, a bracket threaded upon said threaded shaft to lock the threaded shaft to the chuck body in its adjusted position upon the jaws, an operating handle including a shank having on its upper portion a rotatable hand grip element, said shank having a lower portion disposed at an angle to the longitudinal axis of said chuck, there being an interposed connecting bend between the upper and lower portions, said lower portion being connected to the bracket.

ERNEST CURRAN.

REFERENCES CITED

The following references are of record in the file of this patent:

UNITED STATES PATENTS

| Number | Name | Date |
|---|---|---|
| 872,048 | Broad | Nov. 26, 1907 |
| 1,642,569 | Winslow | Sept. 13, 1927 |
| 1,674,223 | Rabut | June 19, 1928 |
| 2,277,961 | Detmers | Mar. 31, 1942 |